United States Patent [19]

Chiou

[11] Patent Number: 5,182,067
[45] Date of Patent: Jan. 26, 1993

[54] PROCESS OF MAKING FIBERS OF SULFONATED POLY(P-PHENYLENE TEREPHTHALAMIDE)

[75] Inventor: Minshon J. Chiou, Richmond, Va.

[73] Assignee: E. I. Du Pont de Nemours and Company, Wilmington, Del.

[21] Appl. No.: 711,583

[22] Filed: Jun. 6, 1991

Related U.S. Application Data

[62] Division of Ser. No. 435,829, Nov. 9, 1989.

[51] Int. Cl.$^5$ ............................. D01D 5/06; D01F 6/60
[52] U.S. Cl. ................................. 264/184; 264/211.14; 264/233
[58] Field of Search ..................... 264/184, 205, 211.12, 264/211.14, 211.16, 233

[56] References Cited

U.S. PATENT DOCUMENTS 3,671,542  6/1972  Kwolek .
3,767,756  6/1972  Blades .................. 264/184
4,016,236  4/1977  Nagasawa et al. ........ 264/184
4,075,269  2/1978  Jones, Jr. et al. ....... 264/184
4,162,346  7/1978  Jones, Jr. et al. ....... 428/364
4,859,393  8/1989  Yang et al. ............. 264/184

FOREIGN PATENT DOCUMENTS 50-16762  2/1975  Japan .

Primary Examiner—Leo B. Tentoni

[57] ABSTRACT

Fiber made from PPD-T with 0.5 to 3.0% sulfur as bound sulfonic acid or sulfonate groups, is disclosed. The fiber has inherent viscosity greater than 4.5, yarn tenacity greater than 20 grams per denier, heat-aged strength retention of greater than 90%, and dipped cord strength greater than 18 gram per denier. The process for making the fiber includes PPD-T sulfonation by exposure to high concentration sulfuric acid in dope preparation under carefully controlled temperature and time.

1 Claim, 1 Drawing Sheet

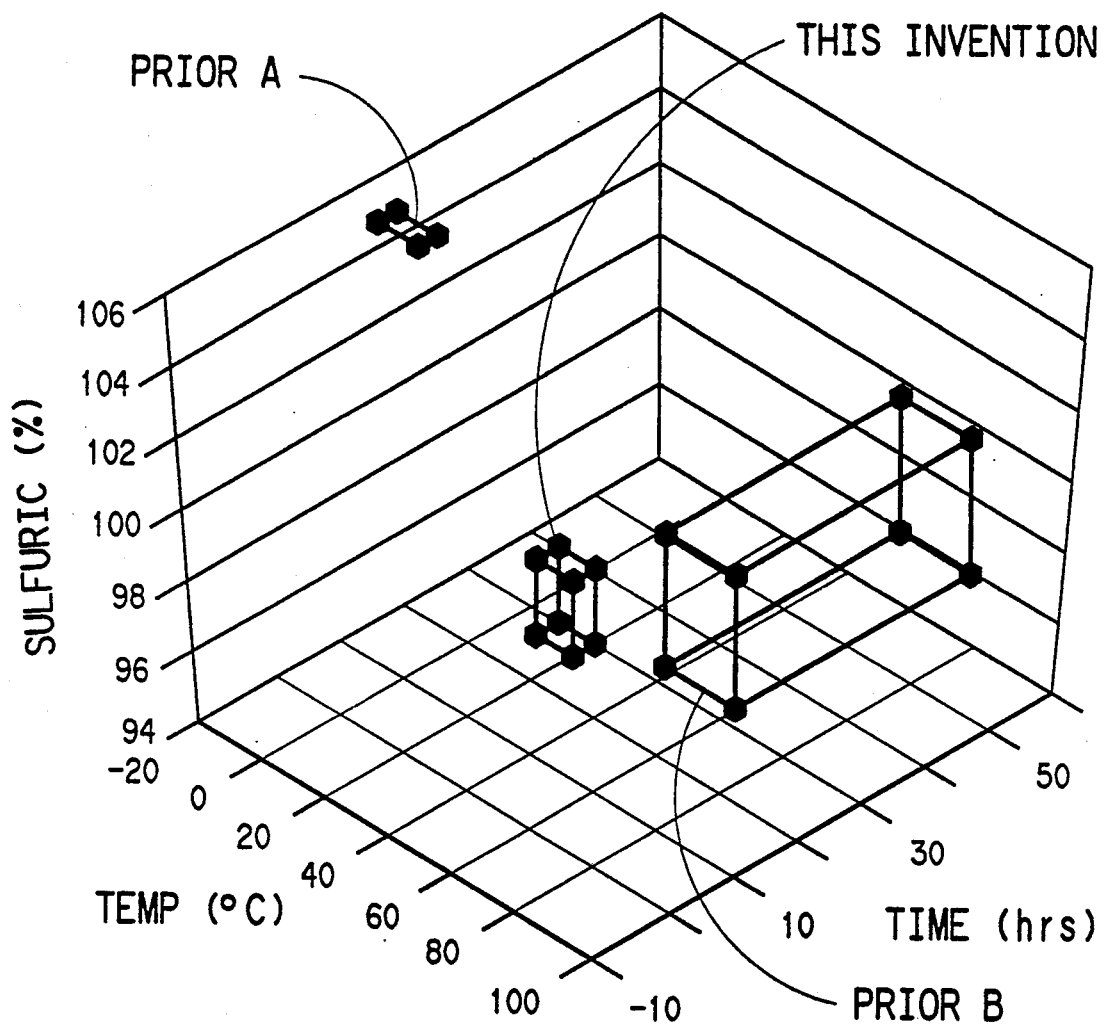

__PROCESS OF MAKING FIBERS OF SULFONATED POLY(P-PHENYLENE TEREPHTHALAMIDE)__

This is a division of application Ser. No. 07/435,829, filed Nov. 9, 1989.

BACKGROUND OF THE INVENTION

1. Field of the Invention

This invention relates to fibers made from sulfonated poly(p-phenylene terephthalamide) (PPD-T) with high inherent viscosity and to a process for making such fibers. The fibers of this invention exhibit unexpectedly high tenacity, both before and after heat treatment at elevated temperatures. The process of this invention yields PPD-T having a very high strength retention after heat aging and an unexpectedly high inherent viscosity in view of the conditions of sulfonation.

2. Description of the Prior Art

U.S. Pat. Nos. 4,075,269 and 4,162,346, issued Feb. 21, 1978 and Jul. 24, 1979 on the applications of R. S. Jones et. al., disclose the spinning of fibers using sulfonated PPD-T of low inherent viscosity and low tenacity. The PPD-T is disclosed to be sulfonated using either concentrated sulfuric acid or fuming sulfuric acid and using specifically defined time and temperature conditions. The as-spun fibers of that invention exhibit single filament tenacities of only about 10-15 grams per denier and, after optimum heat treatment, of about 15-25 grams per denier.

U.S. Pat. No. 3,767,756, issued Oct. 23, 1973 on the application of H. Blades, discloses that fuming sulfuric acid can be used as a dope solvent with PPD-T; but contains caution that the temperature must be kept low and the time of exposure must be kept at a minimum because fuming sulfuric acid is known to degrade the polymer and result in a reduction in inherent viscosity and in fibers of reduced tenacity. Sulfonation of the PPD-T is not mentioned.

U.S. Pat. No. 3,671,542, issued Jun. 20, 1972 on the application of Kwolek, discloses that sulfuric acid having a concentration slightly higher than 100% can be used for a spinning solution solvent with PPD-T but the temperature of solution is about room temperature and the time for affecting solution is several days. Sulfonation of the PPD-T is not mentioned.

Japanese Patent Application Publication (Kokai) No. 50-16762 (1975) published Feb. 21, 1975 discloses dissolving PPD-T in 99.1% sulfuric acid for 17-20 hours at 75-80° C. and for 14 hours at 90-100° C. The polymer was degraded and fibers made from the polymer are disclosed to have a tenacity of about 15 grams per denier. Sulfonation of the PPD-T is not mentioned.

SUMMARY OF THE INVENTION

The present invention provides a fiber made from sulfonated PPD-T wherein the polymer has a high inherent viscosity and includes 0.5 to 3.0%, by weight, sulfur as bound sulfonic acid or sulfonate groups, wherein the fiber exhibits a yarn tenacity of greater than 20 grams per denier, dipped cord strength of greater than 18 grams per denier, heat aged strength retention of greater than 90%, and yarn inherent viscosity of greater than 4.5.

The present invention also provides a process for making a fiber from sulfonated PPD-T by: agitating substantially unsulfonated PPD-T in sulfuric acid having a concentration of 100.5 to 102.5% for a duration of 1 to 3 hours at 70 to 80° C. to dissolve and sulfonate the PPD-T; extruding the resulting solution from an orifice through a layer of inert non-coagulating fluid into a coagulating bath to coagulate the resulting fiber; and drying the fiber to yield an as-spun fiber of sulfonated PPD-T, with high inherent viscosity, high tenacity, and good heat-aged strength retention.

BRIEF DESCRIPTION OF THE DRAWINGS

The FIG. is a three-axis graphical representation of the conditions of this invention for sulfonating PPD-T compared with conditions which have been disclosed in the prior art.

DETAILED DESCRIPTION OF THE INVENTION

Fibers made from PPD-T are well known for their extremely high strength and high modulus. There is, of course, a desire for fibers which are stronger, still, and there has been expressed a need for fibers which will exhibit a high strength before exposure to high temperatures and will retain more of the initial high strength characteristics after exposure to high temperatures.

In uses wherein the fibers are exposed to high temperatures during later processing, such as in the rubber curing steps of tire manufacture, it is important to have cords which do not lose substantial strength during the curing step. It has now been discovered that fibers made from sulfonated PPD-T have the desired high initial strength and also exhibit high retained strength after exposure to high temperatures. The process of the present invention provides a surprisingly high degree of sulfonation balanced against relatively low degree of degradation.

By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or choroor dichloroterephthaloyl chloride; provided, only, that the other aromatic diamines and aromatic diacid chlorides be present in amounts which permit preparation of anisotropic spin dopes. Preparation of PPD-T is described in U.S. Pat. Nos. 3,869,429; 4,308,374; and U.S. Pat. No. 4,698,414.

In the practice of this invention, PPD-T is treated with fuming sulfuric acid of a particular concentration to cause sulfonation of the PPD-T molecules. Conditions are carefully controlled such that the PPD-T is degraded much less than would be expected while, at the same time, achieving the desired degree of sulfonation. The PPD-T to be sulfonated has a high inherent viscosity before sulfonation and retains a high inherent viscosity after sulfonation.

The sulfuric acid used for sulfonation in practice of this invention must be more than 100% sulfuric acid; but cannot be so high that it will cause undue degradation of the PPD-T. It has been found that the degree of sulfonation and the degree of degradation form a balance which is controlled by the sulfuric acid concentration, the time of exposure of PPD-T to that acid, and the temperature of the acid during exposure. It has been found that sulfuric acid of concentrations from about 100 up to about 100.5% yield very little sulfonation compared with the degree or severity or polymer degradation; and that has been found to be true over even long periods of time at relatively high temperatures; and, at temperatures below about 60° C., there is virtually no sulfonation. Sulfuric acid of concentrations above about 103% cause unacceptably severe degradation of PPD-T compared with the degree of sulfonation at any reasonable temperature for any time. A surprising element of the present invention, and what is believed to represent patentable discovery, is that, despite what is taught in the prior art on each side of these conditions, PPD-T is sulfonated and is not unacceptably degraded by exposure to sulfuric acid of concentrations from 100.5 to 102.5% at temperatures of 70 to 80° C. for periods of 1 to 3 hours.

The inherent viscosity of PPD-T is a measure of the molecular weight of the polymer and can be used as an indication of the strength to be expected for fibers made from the polymer as well as a measure of the severity of degradation which the polymer may have undergone in the sulfonation process.

The process of the present invention is generally started using PPD-T having an inherent viscosity of about 6.3 to 6.5. Fibers made in accordance with the sulfonation process of this invention exhibit an inherent viscosity of greater than about 4.5.

It has been determined that such a degradation —from about 6.3 or 6.5 to about 4.5—as is experienced during the practice of the present invention, is much less severe than the degradation experienced by processes of the prior art. For example, when PPD-T having an inherent viscosity of about 6.5 is dissolved and spun using the conditions for fuming sulfuric acid sulfonation from U.S. Pat. No. 4,162,346 (The volume identified as "Prior A" in the Figure), the polymer in the resulting fibers has an inherent viscosity of about 2.9. The polymer in the fibers made using the conditions for concentrated sulfuric acid sulfonation from U.S. Pat. No. 4,162,346 (The volume identified as "Prior B" in the Figure), has an inherent viscosity of about 3.2. As stated, the process of this invention yields PPD-T fibers having an inherent viscosity of more than 4.5;—clearly an unexpectedly high inherent viscosity representing an unexpectedly low degree of degradation.

In preparation of fibers by spinning from solutions of PPD-T, the solvent for the PPD-T is sulfuric acid. The spinning solution of PPD-T is made by dissolving the PPD-T at the desired concentration in sulfuric acid of a concentration of at least 98%. The PPD-T must be in such a concentration that an anisotropic solution is formed of PPD-T in the sulfuric acid. The concentration of PPD-T for practice of this invention is, generally, 17 to about 20 weight percent. The PPD-T which is dissolved in the sulfuric acid can be previously sulfonated or it can be dissolved with the intention of sulfonating it at the same time as it is dissolved. In either event, the conditions for sulfonation must be as have been set out above to practice the present invention. Spinning solutions can be made using sulfuric acid of the concentration necessary for the sulfonation of this invention; and the sulfonation temperature and time ranges for sulfonation are, also, compatible with preparation and use of spinning solutions.

Referring to the Figure, there are shown the limits for sulfonation of PPD-T which have been taught by some prior art references. The volume identified as "Prior A" represents the conditions taught in U.S. Pat. No. 4,162,346 as permitting the use of fuming sulfuric acid. The volume identified as "Prior B" represents the conditions taught in that same patent and, also, in Japanese Pat. Appln. Publn. (Kokai) No. 50-16762 as permitting preparation of PPD-T fibers by use of concentrated sulfuric acid. The volume identified as "This Invention" represents the conditions of the present invention yielding sulfonated PPD-T with comparatively little degradation.

The sulfonation conditions of the present invention result in sulfur levels of 0.5 to 3%, by weight, as bound sulfonic acid or sulfonate groups on the PPD-T. It has been concluded that a sulfur level of less than 0.5% may give rise to the improvement of this invention; but that the improvement is not great and, from a practical matter, not worth the effort. A practical upper limit for sulfur content in PPD-T fibers has been set at about 3%. Accurate determination of the sulfur level is difficult. The aforementioned U.S. Pat. No. 4,162,346 discloses that the PPD-T of that procedure is sulfonated in the range of about 0.5 to 3% of sulfur, while, as will be shown in the Examples to follow, the actual level of sulfonation in the products of that patent appears to be more on the order of 0 to 0.9%.

Fibers of the present invention can be spun using the spinning conditions specifically set out in U.S. Pat. No. 3,767,756. Once the anisotropic spinning dope has been made and the conditions have been met for sulfonation of the PPD-T, the PPD-T solution can be extruded through spinnerets with orifices ranging from about 0.025 to 0.25 mm in diameter, or perhaps slightly larger or smaller. The number, size, shape, and configuration of the orifices are not critical. The extruded dope is conducted into a coagulation bath through a noncoagulating fluid layer. While in the fluid layer, the extruded dope is stretched from as little as 1 to as much as 15 times its initial length (spin stretch factor). The fluid layer is generally air but can be any other inert gas or even liquid which is a noncoagulant for the dope. The noncoagulating fluid layer is generally from 0.1 to 10 centimeters in thickness.

The coagulation bath is aqueous and ranges from pure water, or brine, to as much as 70% sulfuric acid. Bath temperatures can range from below freezing to about 28° C. or, perhaps, slightly higher. It is preferred that the temperature of the coagulation bath be kept below about 10° C., and more preferably, below 5° C., to obtain fibers with the highest initial strength.

After the extruded dope has been conducted through the coagulation bath, the dope has coagulated into a water-swollen fiber. At this point in fiber manufacture, the fiber includes about 50 to 100 percent aqueous coagulation medium, based on dry fiber material, and must be thoroughly washed to remove the salt and acid and free sulfate from the interior of the swollen fiber. The fiber-washing solutions can be water or they can be slightly alkaline. The wet and swollen fiber is conducted from washing and neutralization to a fiber drying step. The fiber can be dried at temperatures of up to as much as 150° C. or slightly higher, under tension or not, as desired for final fiber qualities. Drying the fibers under tension generally causes a decrease in elongation to break and an increase in modulus and tenacity.

The sulfonated fibers of this invention can be heat treated before use or, in some cases, the heat treatment can be conducted as a step in the final use of the fibers. If the fibers are to be heat treated, the heat treatment can be accomplished, for example, at temperatures ranging from about 150° to 550° C., or perhaps slightly higher; at tensions of from about 0.2 to 12 grams per denier and for times of about 1 to 60 seconds or, perhaps, slightly more. At lower heat treating temperatures, longer times can be used and, for higher temperatures—shorter times. As a general rule, heat treatment significantly reduces the tenacity of a fiber; but the tenacity of the sulfonated PPD-T fibers of this invention does not appear to be significantly altered by most heat treatment conditions. Fibers which have not yet been dried can be dried and heat treated at the same time by merely increasing the time of exposure during the heat treatment operations as applied to never-dried fibers.

In the manufacture of tires and in the use of fibers as reinforcement in tire construction, the final step of curing tire cord after it has been dipped in curable subcoating material, involves heating at temperatures of at least 240° C. for a time of about 60 seconds. Heating at such a temperature for such a time amounts to heat treating conditions for the reinforcing fibers. The sulfonated fibers of this invention, having improved properties as a result of heat treating, can be used in tire manufacture and can be improved as a result of the tire curing process.

It has been discovered that the sulfonated PPD-T fibers of this invention exhibit greatly improved tenacity, dipped cord strength, and Heat Aged Strength Retention over PPD-T fibers of the past.

Test Methods

Inherent Viscosity

Inherent Viscosity (IV) is defined by the equation:

$$IV = \ln(\eta_{rel})/c$$

where c is the concentration (0.5 gram of polymer in.100 ml of solvent) of the polymer solution and $n_{rel}$ (relative viscosity) is the ratio between the flow times of the polymer solution and the solvent as measured at 30° C. in a capillary viscometer. The inherent viscosity values reported and specified herein are determined using concentrated sulfuric acid (96% $H_2SO_4$).

Tensile Properties

Tenacity is reported as breaking strength divided by linear density. Modulus is reported as the slope of the initial stress/strain curve converted to the same units as tenacity. Elongation is the percent increase in length at break. Both tenacity and modulus are first computed in g/denier units which, when multiplied by 0.8838, yield dN/tex units. Each reported measurement is the average of 10 breaks.

Tensile properties for yarns are measured at 24° C. and 55% relative humidity after conditioning under the test conditions for a minimum of 14 hours. Before testing, each yarn is twisted to a 1.1 twist multiplier (for example, nominal 1500 denier yarn is twisted about 0.8 turns/cm). Each twisted specimen has a test length of 25.4 cm and is elongated 50% per minute (based on the original unstretched length) using a typical recording stress/strain device.

The twist multiplier (TM) of a yarn is defined as:

$$TM = \frac{tpi \sqrt{Denier}}{73} = \frac{tpc \sqrt{dtex}}{30.3}$$

Wherein
tpi = turns per inch and
tpc = turns per centimeter.

Heat Aged Strength Retention (HASR)

HASR is a test to determine how much of its initial strength a fiber retains after heat aging. HASR is reported in percent of the breaking strength retained after exposure to controlled heat.

To conduct the test, a fresh fiber sample is conditioned at 55% relative humidity and 24° C. for 14 hours. A portion of the sample is subjected to dry heat at a temperature of 240° C. for 3 hours and is then tested for tensile strength (BreakingStrength$_{Heat\ Aged}$). as a control, a portion of the sample without heat treatment is, also, tested for tensile strength (BreakingStrength$_{unaged}$).

$$HASR = \frac{BreakingStrength_{Heat\ Aged}}{BreakingStrength_{Unaged}} \times 100$$

Dipped Cord Tenacity

To prepare samples for this test, yarns are twisted to a twist multiplier of 6.5 in one direction and then they are 2- or 3-plied at a twist multiplier of 6.5 in the opposite direction to form 1500/1/2 or 1500/1/3 cords. The resulting cords are dipped in an epoxy subcoat at 1.0 gpd tension and cured at 245° C. for about 1 minute; followed by dipping in a standard RFL latex formulation at 0.3 gpd and dried at about 235° C. for about 1 minute. The cords are then tested for tensile strength.

Sulfur Content

A yarn sample of small quantity (about 0.5 gram) is dissolved in about 96% sulfuric acid and water is then added to precipitate the polymer. Water is continuously added, thereafter, to thoroughly wash the polymer to remove any free sulfate, such as sodium sulfate, from the polymer. The resulting polymer sample is further dried and carefully weighed before being placed in a Schoniger flask for combustion with pure oxygen. $SO_2$ and $SO_3$ generated by the combustion are absorbed in water to form sulfuric acid. The acid is titrated using barium chloride to determine the sulfur content, as bound sulfonic acid or sulfonate group, of the original yarn sample.

DESCRIPTION OF THE PREFERRED EMBODIMENTS

EXAMPLE 1

PPD-T having 6.3 dl/g inherent viscosity was dissolved in 101% sulfuric acid to a polymer concentration of 19.4%, by weight, and held in a continuous mixer with a residence time of about 30 minutes at a temperature of 80° C. The resultant solution was used directly as spinning dope and was maintained at about 75° C. in an dope holding cell with a residence time of about 3 hours.

The dope was extruded through a spinneret of 1000 holes and at a spin stretch factor of 6.3, through an air gap of 0.6 cm and then into the coagulating bath with about 8% dilute sulfuric acid concentration. The temperature of the coagulating bath was maintained at about 3° C. The fiber produced was washed with water and neutralized with a dilute caustic solution, while held at a tension of about 0.6 gpd. The fiber was then dried on the heated rolls at a temperature of about 150° C. while under a tension of about 0.6 gpd. The yarn was forwarded at a speed of 650 ypm.

The sulfur content of the yarn was analyzed by the above-mentioned method. The yarn was also heat aged and processed into a 2-ply dipped cord according to the above-mentioned method. The yarn and cord properties are reported in Table 1.

TABLE 1

| Yarn inherent viscosity | 4.9 dl/g |
|---|---|
| Denier | 1540 |
| Tenacity, gpd | 24.3 |
| Breaking Strength, lbs | 82.4 |
| Heat-aged Break Str., lbs | 77.4 |
| HASR, % | 94 |
| Dipped Cord Tenacity, gpd | 20.1 |
| Sulfur content, wt % | 0.93 |

Comparison Example A

In this example, the spin dope was prepared in the same manner as described in EXAMPLE 1, except that 100.1% sulfuric acid was used and a temperature of about 105° C. was used in the continuous mixer and about 80° C. was used in the dope holding cell. The yarn was spun and tested in the same manner as described in EXAMPLE 1; and the resulting fiber properties are reported in Table A.

TABLE A

| Yarn inherent viscosity | 5.3 dl/g |
|---|---|
| Denier | 1482 |
| Tenacity, gpd | 24.5 |
| Breaking Strength, lbs | 79.9 |
| Heat-aged Break Str., lbs | 63.8 |
| HASR, % | 80 |
| Dipped Cord tenacity, gpd | 18.5 |
| Sulfur content, wt % | 0.24 |

The sulfur content of the material treated by the process of this invention was very high compared with the sulfur content of the material from the comparative example. It is, also, evident that the heat-aged strength retention and the dipped cord tenacity of the material of this invention are much higher than those of the material of the comparative example, even though the yarn tenacities are about the same.

EXAMPLES 2 AND COMPARISON EXAMPLES B-E

In Example 2 and Comparison Examples B-E, the spin dopes were prepared by a batch process in a single mixer. PPD-T polymer with 6.3 dl/g inherent viscosity was dissolved in various sulfuric acid concentrations and under various time, temperature and polymer concentrations as described in Table 2. The dope was extruded through a spinneret of 267 holes and through an air gap of 0.6 cm and then into the coagulating bath with water. The temperature of the coagulating bath was maintained at about 3° C. The fiber produced was washed with soft water and neutralized with a caustic solution, while held at tensions of about 0.6 gpd. It was then dried on heated rolls at a temperature of about 150° C. while held under a tension of about 0.6 gpd. The yarn was forwarded at a speed of 850 ypm. The resulting yarn properties are reported in Table 2.

TABLE 2

|  | EX. 2 | EX. B | EX. C | EX. D | EX. E |
|---|---|---|---|---|---|
| Sulfuric acid conc., % | 101.00 | 100.07 | 100.07 | 99.60 | 99.60 |
| Polymer conc., wt % | 19.4 | 19.4 | 20.0 | 20.0 | 20.0 |
| Solutioning conditions: | | | | | |
| Temp (°C.) | 75 | 80 | * | 90 | 90 |
| Time (hr) | 2 | 2 | * | 28.5 | 22.5 |
| Yarn Properties: | | | | | |
| inh viscosity, dl/g | 4.7 | 5.9 | 2.4 | 3.2 | 3.6 |
| Denier | 420 | 395 | 428 | 396 | 403 |
| Tenacity, gpd | 21.9 | 23.5 | 11.6 | 14.3 | 14.0 |
| Sulfur content, wt % | 0.85 | 0.22 | 0.87 | 0.03 | 0.00 |

*Polymer was subjected to two different conditions - 10.5 hours at 90° C. followed by 5.25 hours at 95° C.

The fiber of Example 2 exhibits a high degree of sulfonation and a comparatively low degree of degradation while the fibers of the Comparative Examples exhibit either inadequate sulfonation or excessive degradation, or both.

What is claimed is:

1. A process for making a fiber from sulfonated PPD-T comprising the steps of:
   (a) agitating substantially unsulfonated PPD-T having an intent viscosity greater than 6 in sulfuric acid having a concentration of 100.5 to 102.5% in an amount such that there is 17 to 20 weight percent of PPD-T in the sulfuric acid, for a duration of 1 to 3 hours at a temperature of 70° to 80° C. to dissolve and sulfonate the PPD-T;
   (b) extruding the resulting solution from an orifice through a layer of inert non-coagulating fluid into a coagulating bath to coagulate the resulting fiber;
   (c) washing the coagulated fiber in an aqueous fiber-washing solution;
   (d) drying the fiber to yield a dry as-spun fiber of PPD-T having an inherent viscosity greater than 4.5 and a sulfonation of 0.5 to 3.0% sulfur, as bound sulfonic acid or sulfonate groups.

* * * * *

UNITED STATES PATENT AND TRADEMARK OFFICE
CERTIFICATE OF CORRECTION

PATENT NO. : 5,182,067
DATED : January 26, 1993
INVENTOR(S) : MINSHON J. CHIOU

It is certified that error appears in the above—identified patent and that said Letters Patent is hereby corrected as shown below:

Column 8, Claim 1, Line 43, "intent" should be changed to "inherent"

Signed and Sealed this

Second Day of November, 1993

Attest:

BRUCE LEHMAN

Attesting Officer

Commissioner of Patents and Trademarks